United States Patent [19]

Pryor

[11] 4,131,365

[45] Dec. 26, 1978

[54] METHOD AND APPARATUS FOR DETERMINING OBJECT POSITION AND DIMENSION USING A DIFFRACTION WAVE

[76] Inventor: Timothy R. Pryor, 1578 Cherrylawn Crescent, Windsor, Ontario, Canada, N9E 1P4

[21] Appl. No.: 744,755

[22] Filed: Nov. 24, 1976

Related U.S. Application Data

[60] Division of Ser. No. 505,777, Sep. 13, 1974, Pat. No. 4,009,965, which is a continuation-in-part of Ser. No. 253,421, May 15, 1972, Pat. No. 3,884,581, and Ser. No. 358,547, May 9, 1973, Pat. No. 3,883,249.

[51] Int. Cl.$^2$ .................... G01B 9/02; G01B 11/26
[52] U.S. Cl. ................................. 356/356; 356/400; 356/387
[58] Field of Search ............... 356/172, 132, 167, 111; 250/574, 575

[56] References Cited

U.S. PATENT DOCUMENTS

| 3,749,500 | 7/1973 | Carlson | 350/167 |
| 3,781,115 | 12/1973 | Rader | 356/172 |

*Primary Examiner*—Conrad J. Clark
*Attorney, Agent, or Firm*—Larson, Taylor and Hinds

[57] ABSTRACT

The disclosed invention relates to methods and apparatus for obtaining the dimension, position or angle of an object using a point on the object boundary surface to create a diffraction wave when illuminated by a laser beam or other source of electro-magnetic radiation. This diffraction wave is then analyzed to obtain information as to the position point tangent to the laser beam or the angular orientation of the object boundary at said object point.

12 Claims, 13 Drawing Figures

OUTPUT OF DETECTOR VIEWING DIFFRACTION WAVE AS A FUNCTION OF DISTANCE OF DIFFRACTING OBJECT FROM LASER BEAM CENTERLINE, d

METHOD AND APPARATUS FOR DETERMINING OBJECT POSITION AND DIMENSION USING A DIFFRACTION WAVE

This is a division of co-pending application Ser. No. 505,777, filed Sept. 13, 1974, now U.S. Pat. No. 4,009,965, which was in turn a continuation-in-part of Ser. No. 253,421 of May 15, 1972, now U.S. Pat. No. 3,884,581 and Ser. No. 358,547 of May 9, 1973, now U.S. Pat. No. 3,883,249.

INTRODUCTION

It is of considerable use in both industry and research to be able to measure the position, dimensions and angular orientations of objects to a high degree of accuracy without contacting the object. In my experimentation to-date, including U.S. Pats. Nos. 3,797,939; 3,884,581; and 3,883,249, I have found serveral ways of determining such dimensions using the diffraction wave emitted from the boundary of an object when a laser beam or other source of radiation is incident on said boundary. I have found that this diffraction wave carries the information as to the location in space of the object boundary and the angular orientation of same. Methods and apparatus for obtaining such information, including object dimension, from such diffraction waves constitute the invention here disclosed.

Much of the subject matter disclosed in this application has also been described in my disclosure documents Nos. 025258 and 030037 dated Nov. 20, 1973 and Mar. 25, 1974 respectively.

Since the only interaction with the object is made by the laser beam itself there is no physical contact required. Therefore the disclosed invention is a true non-contact measuring system which is highly desirable for the high speed measurement of objects on production lines, conveyors, etc. Such non-contacting systems also have no contact pressure error, an important feature in high resolution measurements. In addition no gage wear or part damage due to contact results.

Because of the speed of response of the various detection means used in the embodiments disclosed, the invention is capable of essentially continuous measurement of moving products and parts and can be used to great advantage in many industrial applications. High speed research measurements are possible as well.

The embodiments of the invention are shown in the following illustrations:

DETAILED DESCRIPTION

Figure 1:
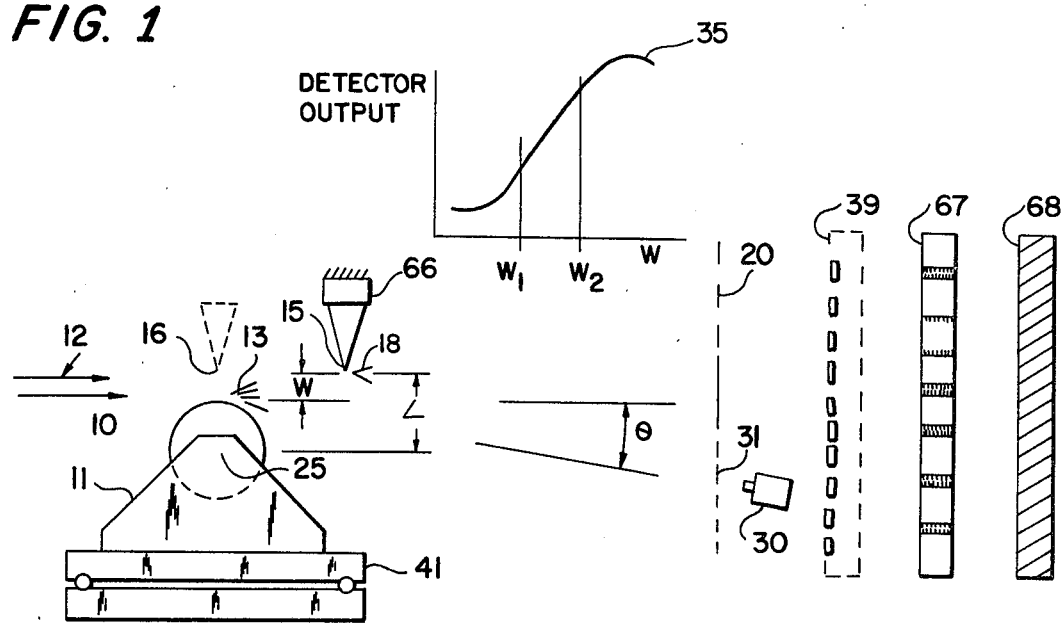
FIG. 1 illustrates an embodiment of the invention utilizing a reference diffraction wave producing means to cause interference with a diffraction wave from the object boundary.

FIG. 1 illustrates a basic system used for determining part sizes in a manner similar to that discussed in my application No. 253,421 to which this application is a continuation-in-part. Cylindrical object 10 is placed on reference fixture 11 and illuminated by laser beam 12 producing a diffraction wave 13 as shown. A reference edge placed in either position 15 or 16 (dotted lines) produces a second diffraction wave 18 which interferes with the wave 13 to produce a characteristic interference pattern 20, which has been disclosed in the references.

For purposes of measurement of object dimension it is necessary, in this embodiment, to determine the separation distance, w, perpendicular to the direction of laser beam propagation between the object boundary surface and the reference object boundary or other diffraction wave producing means; w is then subtracted from the distance, L (also referred to herein as "R") between the reference and the fixture position 25 to obtain the object dimension. In comparing successive parts it is only necessary to determine the change in w between one part and the next, since the fixturing remains the same. In this latter situation, a master part is usually inserted to obtain an initial value, or high/low masters used to define a range of measurement.

Where high-low masters are used, the simplest way to determine the changes in w from part to part is to locate a single detector, 30, at a fixed off-axis location $\theta$. This detector sees a portion of a single fringe 31 and as long as the variations in size (ie. changes in w) are such that a portion of the ramp of any one fringe is on the detector, then the detector will essentially operate over its linear output range (verus fringe motion) shown in the graph, 35. This linear output can be sub-divided into approximately two hundred parts, if desired, without much difficulty, and a resolution of therefore 1 part in two hundred of whatever the linear ramp height is obtained. Such resolution can be extremely high at larger angles $\theta$, where the total linear ramp may represent ony 0.0001", or even one micron.

Where it is desirable not to have to continually calibrate using master parts, as well as in certain other applications, a scanning photodiode array such as 39, (shown in dotted lines), can be used to determine the fringe spacing, s, or its inverse, fringe frequency. The number of diodes which are contained between fringes can be used to determine w directly using the formula 1 below. Recent developments allow up to 1024 elements to be on any one array which implies extremely high resolution (assuming enough power is available to cause a determinable threshold difference between one diode and the next).

, $w = R\lambda/s$, where $s$ = fringe spacing $w = 2nR\lambda/(2x_n)$, where $n$ = order number, $2x_n$ = distance across pattern centerline between like orders $n$. (1)

The above systems are not limited to the process of repetitive inspection of fixtured parts, since an absolute measurement is possible in the case of the photodiode array. Alternatively, of course dimensional measurements of continous products such as bars moving in the direction out of the plane of the paper may be performed. This case has been particularly discussed in some of my previous patent applications.

The fixture in FIG. 1 can be dispersed with, and object diameter measured using two reference boundaries spaced a known amount, one on each side of the object, and two measurement stations of the type shown. Alternatively, the individual diffraction boundary waves from each side of the test object can be combined.

Figure 3:
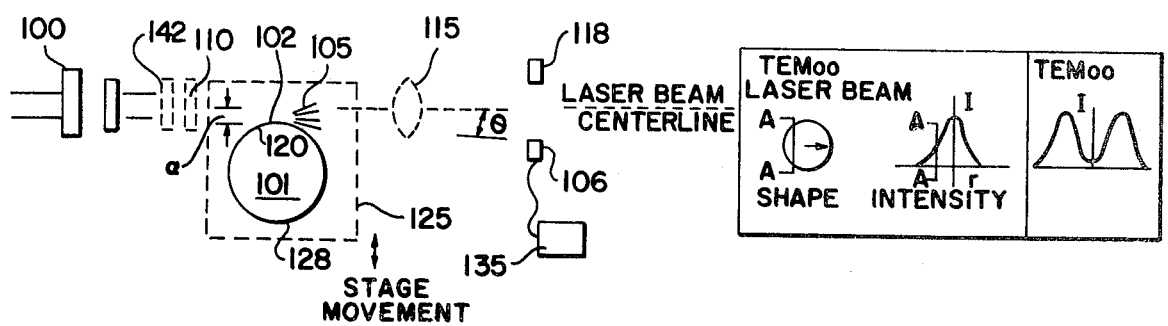
FIG. 3 illustrates an embodiment incorporating a means for obtaining object position and dimension utilizing the intensity of the diffraction wave from the object boundary.

Note, that many other means disclosed in my referenced applications can be used to determine the value w required to obtain object dimension. In particular, it is noted that the position of the reference boundary can be changed by a known amount using actuator means 66, for example, a piezo electric expander responsive to voltage, such that the interference pattern reverted back to some known value. This known value is usually that existing when a master object is used, and in this case the amount of movement of the reference indicates the deviation from the master. Where an off-axis detector, such as 30, is utilized, a convenient situation is to make the known value a fringe minimum or maximum. This is particularly true when a split photocell detector and differential amplifier is used, giving a zero differential voltage output under such conditions. A further discussion of this and other null type systems (using changes in wave length, detector position x, etc.) appears in my co-pending applications, particularly No. 253,419 (FIG. 3).

Note that multiple positions on the part, in the direction out of the plane of the figure, can be sensed simultaneously, using single wave source and a plurality of photo detectors out of the diagram. Where a scanning array detector is desired, such as for fringe spacing or position measurement, a single square matrix array can be used, (or less desirably, a T.V. camera).

Note as well that curved objects such as ball bearings may be measured using the invention. Measurement may be at a single point (or diametrical points) just as described above, or along a circular profile using a matching circular reference edge, with detection means positioned accordingly.

In addition, note that the filter and moire techniques described in my referenced applications and patent may also be used to advantage in FIG. 1 situations. In this case, detector 30 is dispensed with and the pattern is allowed to project thru spatial filter 67 onto large detector 68 (or its equivalent), shown in shaded lines.

This filter is a negative of pre-recorded interference pattern, usually produced when a master object is located in the fixture.

Accordingly when the part tested is of the same dimension as that represented by the filter pattern, a minimum of light is detected. I have found that over a small percentage w range deviations in w from this situation are linear in terms of detector output. Direction of change however, cannot be determined.

I have also found that the filter produces moire fringes whose spacing is proportional to the difference between the recorded and actual patterns. This moire spacing may therefore be used to give the amount of deviation from a master part.

Figure 2:
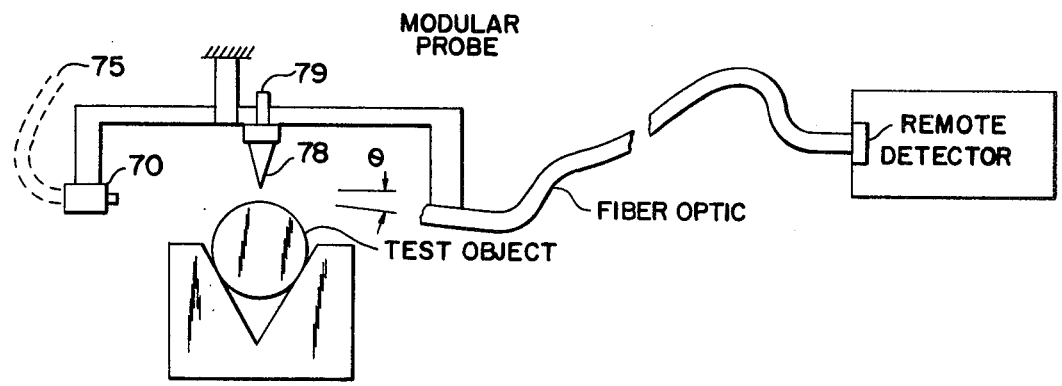
FIG. 2 illustrates a modular version of an alternative embodiment of the invention employing reference diffraction wave producing means.

FIG. 2 illustrates a particularly useful modularized version of the basic system shown in FIG. 1. In this case, light source, reference edge and detection means, are all co-located in a probe which can be unitarily mounted to a fixture holding a part or otherwise. For the sake of small size, a semi-conducting diode laser 70 can be used or, alternatively, a special coherent single mode fiber optic light guide such as Selfoc, or the equivalent, can be used to convey an external gas laser beam, as shown in dotted lines 75.

While the scanning photodiode array detection shown in FIG. 1 above can be used, the modular form often incorporates the simpler single off axis detector (also shown in FIG. 1). In the particular case illustrated the detector is not however, located in the module, but instead is located back at a central console using a simple coherent fiber optic bundle (flat or round) to carry the light back to a detector in the console. This detector is located in a shielded area and utilizes an interference filter so as to observe only laser light on its face. I have also found that Selfoc single fibers can also transmit such patterns or portions thereof, back to a central location as shown.

Generally speaking, the module reference edge 78 can be fine adjusted after installation using a fine adjust screw 79 or the like to get the fringe desired onto the linear range of the detector (whose angle $\theta$ is either fixed at the factory or changeable using a similar adjustment mechanism). Both fine adjusts can also be done electrically to advantage using piezo electric translation elements or the like.

The modules described are quite useful in production areas since they are easy to understand and use. In addition, modules utilizing fiber optics to carry the light back to a central position can be used just like their all electronic equivalents. Many modules for example can be plugged into a single readout box and switched from one reading to the next using a single detector with multiple fiber inputs from different sensor positions which can be switched by a shutter. A single laser can service mutliple modules as well, via single mode fiber optics.

The fiber means shown may transmit larger angular regions of the interference pattern back to the detector, allowing quasi-digital pattern spacing or position measurements to be made at a central location, rather than analog intensity at a given off-axis $\theta$ position.

FIG. 3 illustrates an embodiment operating on an amplitude intercepted principle totally different from the interference based embodiments above.

In the first version of FIG. 3 to be discussed, a $TEM_{oo}$ laser beam 100, is incident on the cylindrical surface of the object to be measured, 101, at the point of tangency, 102. As shown in the inset of FIG. 3, this laser beam is characteristically round and has a gaussian beam intensity profile.

Figure 4:
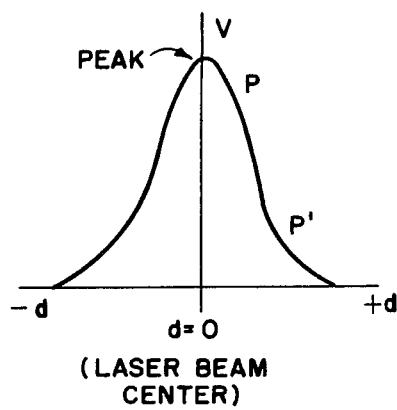
FIG. 4 illustrates further operational details of the embodiment shown in FIG. 3.

I have found that the resulting diffraction wave emanating from such an object is produced by a very small region around the boundary point 102 of the object. Therefore I realized that an excellent way to determine the point of said boundary (which is used for making measurements of object position or dimension), is to relate the intensity of the detected diffraction wave 105, detected for example by detector 106, to the relative energy in the portion of the laser beam hitting the boundary. For example, taking the round, Gaussian, input laser beam mentioned above, it is apparent that if the portion of the beam along section AA shown is incident just at the boundary point 102 of the object, the intensity will be proportional to the amount of energy in that section AA. Accordingly, the movement of the object through the laser beam would produce an output characteristic in terms of the diffracted wave intensity such as shown in FIG. 4. This output is quasi-linear over a significant ramp, due both to the Gaussian distribution and the chordal intercept of the round beam.

High-low master objects are often used to establish points on the curve of FIG. 4, and particularly to define points P and $P^1$ between which the detector output is quite linear and therefore of advantage for measurement purposes. With a typical raw He-Ne laser beam, the quasi-linear (to 1%) portion corresponds to a range of approximately 0.008 inches (0.2 mm) and can be reliably split into 200 parts. Accordingly, therefore, parts such as 101 can be put into a Vee block fixture, for example, and the output voltage from the detector over an eight thousandths range will indicate the part dimension to 40 millionths of an inch (1 micron) since the distance from the laser beam center line to the fixture is known.

At the one part in 200 level, the angular deviations (on the order of 0.03 milliradians) of the laser beam are obviously not significant, at least when the laser is relatively close to the object to be measured. At longer ranges, this has to be taken into account, as do the oscillations of the laser beam due to thermal currents in the air.

To achieve higher sensitivities, the laser beam may be optionally focused with either a cylindrical or spherical lens, such as 110 shown in dotted lines, to form a smaller Gaussian beam profile at the measuring point of tangency, 102. In this case, the range of measurement is decreased, with a corresponding increase in resolution. Since the focused beam is also of Gaussian distribution, the response curve and resolution is the same, ie. roughly one part in 200 of range. In this manner very high resolutions can be obtained, since such beams may be focused to dimensions of 0.0001" (2 um), for example. When such short focal lengths are used however, the lens must be physically close to the object, which is often a disadvantage. Furthermore, the object is more constrained in the Z axis (direction of beam propagation) due to depth of focus limitations of the lens. Note that Fresnel, as well as geometric lenses may be used.

An alternative arrangement is to utilize a lens to expand the laser beam, thereby forming a larger Gaussian beam for use over longer ranges. Generally speaking however, other competitive optical mesurement systems are usually more practical in the longer range cases.

The absolute amount of the diffraction wave which is detected is not particularly important as long as the detector is located at the same angular position and is effectively receiving the same solid angle of radiation throughout the measurement. For utmost accuracy, a lens such as 115 (shown in dotted lines) can be inserted to assure that the detector receives the same solid angular portion independent of the position of the object in the X direction.

When a detector such as 106 is located below the axis, it is clear that it sees only the diffracted radiation. However, it is also possible to operate the invention with a detector above the axis, such as 118 shown. At increased angles $\theta$ above the axis however, increasing amounts of reflected wave are received from portions 120 of the cylindrical boundary and the chance of error due to surface reflection effects is increased. It is therefore generally preferable, but not necessary, to locate the detector in the pure diffraction wave zone. Only in this way, can one intercept the minimum portion of the incident beam and achieve the high linearity and performance possible.

There are many possible variations of the apparatus just described, since we note that measurement, in effect, is a function of some characteristic of the input beam spatial distribution which is picked off, so to speak, by the portion of space around the boundary which diffracts the light to the detector. This is the core of this embodiment of the invention.

The first variation in the embodiment of FIG. 3 is to utilize the occurrence of the peak in the Gaussian output curve shown in FIG. 4. This peak voltage occurs when the object edge intercepts the center of the laser beam and can be used as an indicator of the presence of such a situation. Since the laser beam center line is presumed known, this then pin-points the location of the object boundary in space.

Consider the measurement of a cylindrical object such as 101 in FIG. 3 by moving it on a precisely controlled coordinate stage 125 shown in dotted lines in that figure. The output signal from detector 106 is used to indicate the presence of the boundary point 102 and to start a counting circuit in operation. This counting circuit counts the number of stepper motor cycles (for example) used to precisely traverse the object through the laser beam such that the opposite object boundary point 128 is once again detected by the detector to be in the center of the beam. At such time the counter is stopped and the total number of counts times the amount of linear motion of the stage per count gives the diameter of the object.

As is apparent, when reading point 128, detector 106 would be operating in the reflective zone and, if this is not desirable, a second detector such as 118 can be utilized to measure in the diffraction only regions when the opposite object point 128 is centered on the beam. Such a system provides a non-contact determination of precise geometric object points which is extremely useful in the calibration of plug gauges and the like. This is a real advance in the state of the art. While interferometer and precise stepper motor controlled translation stages are commonly available, means for determining the object boundary location without contact are not.

Clearly, sensitivity of the system in this peak detection mode is not a function of analog drifts or other such afflictions, as is the linear ramp mode discussed above. It does however, involve the storing of the signals in order to perform a comparison to determine at what time, ie. location, the beam center has been intersected. This store and compare circuit is shown as 135 in FIG. 3. Optional lens, 110, can also be used to increase sensitivity in this mode as well.

Clearly, both of the FIG. 3 versions would be enhanced if a means to produce a laser beam with a sharper ramp or a more well defined peak (or other indicator of the object boundary being centered in the laser beam) were available. Accordingly, here disclosed are several means for doing this. For example, a wedge shaped amplitude filter, can be placed in the laser beam to cause the light to be sharply peaked in the center with a more rapid, and linear, fall-off than the normal Gaussian fall-off to the edges.

Another alternative is to use the $TEM_{10}$ or $TEM_{10*}$ (doughnut) modes of the laser. In this case a sharp minimum lies in the center of the laser beam and this minimum zone is considerably sharper and more defined than the peak of the $TEM_{oo}$ Gaussian. The ramp heights are also steeper in a similar manner to the use of the $TEM_{01}$ mode. It is also possible to combine incident laser beams to produce a sharper peak or ramp. For example, two $TEM_{oo}$ beams may be slightly superposed such that their linear ramp portions intersect. In this case the output curve has a triangular spike depression in its center, as is highly desirable.

Another variation is to have the two beams intersect at slightly different angles such that the diffraction wave produced by the intercepted portions of each at the same time comes from slightly different points on the object boundary. In this case the detector looking at one of the diffraction waves (which for example can be of different polarization, wave length, out of plane, etc., so to miss that of other detector looking at the second wave) sees the peak at a slightly different time than the first detector. In this case both detectors will see slightly less than the peak (on opposite sides of their ramps) at the same time and this equal reception situation can be used to define the presence of a peak.

A variation on the two beam idea is to project a laser beam through a polarizer composed of two halves in opposite polarization with a sharp demarcation parallel to the object boundary when the object is centered on the demarcation line the polarization of the diffraction will switch a condition which can be easily detected by two detectors with opposite polarizers on their face (corresponding to one of the two situations) and connected in a bridge circuit. In fact, by utilizing suitable phase shifting through a 1/4 wave plate, the actual direction of change can be noticed.

It is further noted that by utilizing a cylinder lens such as 142 shown in FIG. 3 (dotted lines) the light may be focused to a point or spread into a fan in the YZ plane, in order that either the average over an extension of a large portion of the boundary surface or a very small region can be simultaneously obtained from the total diffraction wave from either the large portion or the small region. This ability to focus or expand the light leads to the possibility of measuring profile of the boundary surface by scanning the surface in the y direction past a system such as shown in FIG. 3 or by illuminating the whole extension of the surface at once and scanning the detector through the total resulting diffraction wave extended in the Y direction. A final version would leave the object fixed and scan the laser beam down the object using an adequately stable traversing mechanism.

By using a $TEM_{11}$ mode, a beam with cross shaped minima can be produced, allowing a sensor of the FIG. 3 type to be built having two detectors each in different quadrants so as to measure the diffraction waves relating to object position relative to the center of the laser beam in two orthogonal directions. And too, the $TEM_{01*}$ doughnut mode can be used to locate a two dimensional object boundary in space by noticing where two orthogonal diffraction waves are minimized, corresponding to object boundary location in the center of the doughnut. A good example of this would be a reflective spot placed on an object which centered in the $TEM_{01*}$ laser beam would produce a minimum diffraction wave in all directions. Over a small range of motion this spot could be accurately tracked around this center point just as with the Gaussian situation of FIG. 3.

Note that in the FIG. 3 apparatus it is possible to move the laser beam slightly up and down, leaving the object fixed. When only small movements are required it is clear that a simple angular scanning motion, for example using scanner 145 (shown on dotted lines) which could be a rotating mirror or wedge etc., can be used to move the laser beam at the point of measurement by known amounts. In this case the edge detection using the peak of the Gaussian is employed by detector and scanner position related to that of the boundary. Alternatively, associated circuitry could be used to cause the scanning motion to center the beam on the object. In this case, the amount of voltage, for example, applied to the scanner to keep the beam centered is then an indication of the position of the edge, as desired. Note too that a system such as FIG. 13 can be used for scanning and collecting a collimated beam across an object so as to determine one or more boundary positions in sequence. Such a system can therefore be used to determine object diameter, profile, etc.

If required, scanning could be done at extremely high speed using electro or acousto-optic scanners which are capable of moving a spot through one of four hundred independent positions in such a system in less than $10^{-4}$ sec. The readings could be made by merely determining which of the four hundred spots produced the peak reading and that particular spot center would be the position of the boundary. Such a unit is very fast and can be used in many types of on-line measurement situations, for example where the cylinder object of FIG. 3 is a bar moving out of the plane of the paper.

Note that these intercept diffraction embodiments can also be packaged in modular form along the lines of FIG. 2 (less reference edge). Fiber optics may be used to advantage to bring light in and transport diffraction waves to a remote detector. Again, multiple sensor positions can be monitored from central location. A significant difference in implementation of the embodiments just described is that the incident electro-magnetic radiation beams need not be spatially coherent or monochromatic. All it really has to have is a "shape" either geometric, such as a round beam (or better, triangular or diamond shaped) or in its intensity distribution, eg. Gaussian, triangular, etc. The beam should be reasonably collimated, however. Note that these same remarks hold true with respect to the embodiment of FIG. 5, and that a collimated LED makes an excellent source for both embodiments.

Note that the disclosed embodiment can also be utilized to determine the presence, desirable or otherwise, of a diffracting boundary. An example is in determining the amount and presence of locking compound applied to the roots of screw threads.

It is further noted that the detector may simultaneously observe the summed intensity of diffraction waves produced at multiple separated measurement positions, using suitable combining lens or fiber optics. Moreover, measurement is independent of rotation of the boundary in the plane perpendicular to the laser beam, it means, such as a ring shaped lens element, is provided to always direct the same portion of the diffraction wave to the detector. The detector of course, could be ring-shaped itself.

Figure 5:
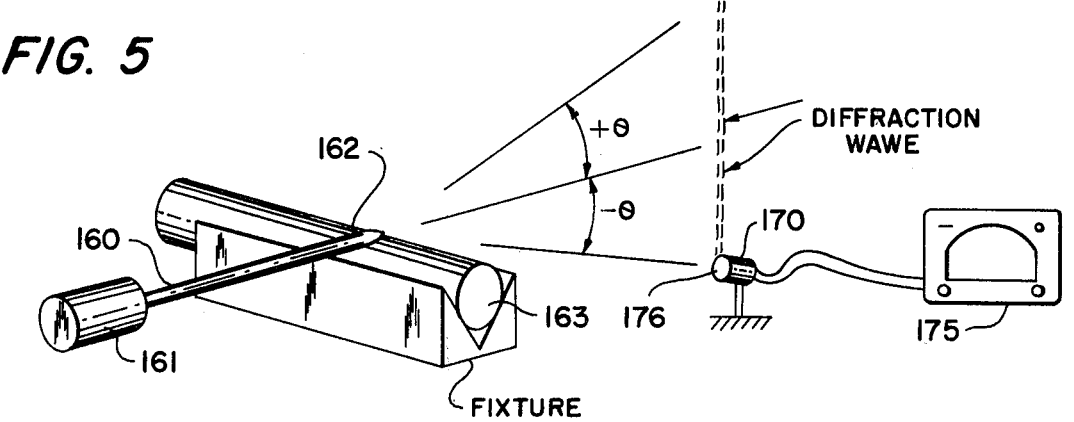
FIG. 5 illustrates an embodiment of the invention wherein the angle of the object boundary relative to another point on the object or an external reference is determined using a diffraction boundary wave from the object.

FIG. 5 illustrates the embodiment of the invention utilized for measuring the angular relationship of a portion of a boundary surface of an object relative to some external reference direction or other boundary portion of the same object. This embodiment makes use of the fact that the diffraction wave emitted from a boundary is always emitted in the plane perpendicular to the extension of the boundary at the point in question. Thus, measurement of the orientation in space of the diffraction wave allows determination of the angular orientation of the boundary.

Practical apparatus is illustrated in the embodiment of FIG. 5, wherein laser beam 160 from laser 161 strikes the boundary 162 of object 163. As in the embodiments above, the diffraction wave is emitted perpendicular to the boundary and, in this case, its angular orientation in space is monitored using a position sensitive detector means 170 such as a UDT SC-10 or pin 2D, whose elements are connected in a differential amplifier circuit in readout 175.

The detector is fixed relative to the fixture holding the object and is typically aligned (or electronically zeroed using a stable offset voltage) so as to read a zero differential signal when a master object is placed in the fixture. In other words, with a master object in place, the diffracted wave is effectively centered on the detector axis, 176.

Since the laser beam is Gaussian, the diffraction wave from the boundary also has a Gaussian intensity profile and this profile is therefore observed by the detector. When test parts are substituted in the fixture for the master, the detector sees changes due to the movement of this Gaussian beam profile in space, yielding an output curve similar to FIG. 4. Resolution of part angle is typically very high, (on the order of several seconds of arc) and can be very fast, a desirable feature for on-line measurements of parts and materials.

While the unit shown utilizes a detector located in the pure diffraction wave zone, such detection may also be utilized in the reflection/diffraction zone from a curved object as shown using detector 180. In this case much higher light intensity is available (due to the reflection properties of most cylindrical objects in industrial usage and larger angles $\theta$ may be used than would be the case in the rather limited $\theta$ zone in the pure diffraction wave of a cylindrical object (especially those with large radii). Due to reflection properties however, the wave profile gets increasingly broad with increasing $\theta$ and therefore resolution is not necessarily increased. Generally speaking, therefore, one usually operates fairly close to the pattern center line, that is within $\theta$ less than ten degrees.

Note that embodiments of FIGS. 3 and 5 can be combined. In other words, the angular orientation and position of an object boundary can be simultaneously determined. Screw threads are an important class of objects where this is of interest.

For maximum diffraction wave intensity and therefore angular resolution, the incident beam may be focused onto the object boundary using a spherical lens. This works best when object boundary position is relatively invariant with respect to the beam centerline.

It is obviously not necessary to use a master object to set up a system although this is almost always the case. For example the position of the detector might be referenced directly off the axis of the fixture, without recourse to a master part.

Where an included angle of a part (for example, of an injector plunger cone or the key stone groove on a piston) is to be measured, two diffraction waves may be produced each of which is monitored by a photocell system such as the one shown. In this case no master is required and it is only necessary to compare the sensor outputs to measure the included angle. However, a master is almost always used to set the system up.

This included angle can also be measured by rotating a single photosensor to the system through the angle desired picking up both of the diffraction waves and measuring the angle rotated through.

Many other sensing systems are possible besides the position sensing photocell discussed above. For example, just a single photocell may be used to pick up the center of the laser beam Gaussian thereby giving its location in space. Alternatively the linear portion of the Gaussian beam ramp, as in FIG. 3, may be utilized with a single photocell to give an indication of the angular position in space of the diffraction wave. In this case the detector is made small so as to subtend only a portion of the Gaussian diffraction wave profile on the detector.

As in the discussion of FIG. 3, non-Gaussian laser beams can be used and particularly advantageous is the $TEM_{10}$ mode wherein the black center minimum is perpendicular to the boundary. In this case the minimum is detected by a single or position sensing photocell and provides increased resolution. Other detection means can also be used, of course.

The use of a fixture is necessary in many systems, for example, those where some angular reference can be taken from the object itself. An example is the case of the piston ring grooves. If one was measuring one of the groove faces and the sides of the piston could be assumed to be a reference surface, then another diffraction wave monitor system of the type disclosed could be used to determine the angular orientation of the reference boundary which would then be compared with the groove boundary to get the angle of interest. The two signals can thus be compared even though the axis of the piston was not perfectly aligned with the fixture holding the detectors as it would be if the part was properly fixtured. Thus, on-line measurements can be made in situations were fixturing is not possible.

Clearly, the sensing means described above could be used as well with both a focused incident beam (to isolate a small portion of the boundary) and with expanded beams (to average the angular characteristics of a large segment of the boundary). The embodiment can be used for any boundary of non-zero radius which creates a diffraction wave.

Another type of detector which can be used to track the position of the diffraction wave is the scanning photodiode array or, less desirably, a television camera. Both of these can be used to find the center of the diffraction wave over a considerably larger range than the single detector described. A single position sensing detector such as split photocell or its continuous counterpart (for example a UDT corporation SC-10) is more attractive however, from a price performance point of view. The scanning photodiode array, however, does offer the possibility of an intrinsically digital measurement system. There are a wide range of object angles which can be measured in this manner and is very useful from an industrial point of view.

Figure 6:
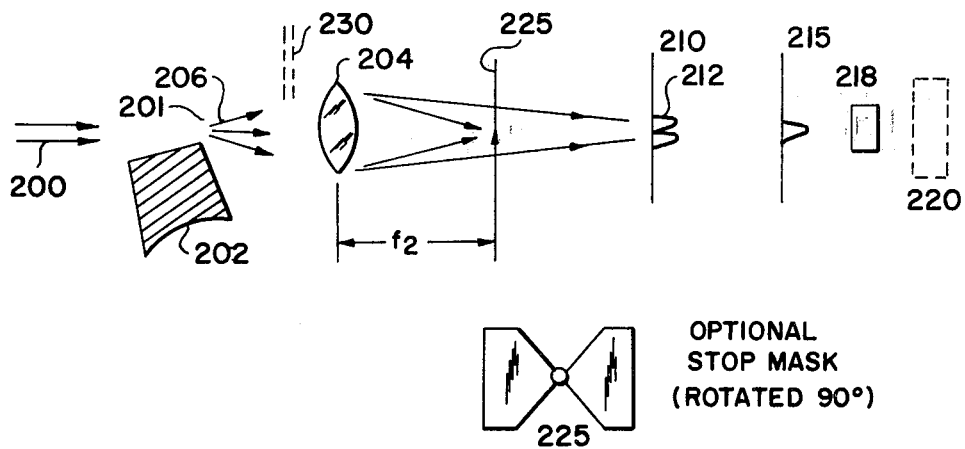
FIG. 6 illustrates an embodiment of the invention incorporating means for obtaining, and determining the position of, a moveable object spot corresponding to the position of a diffracting object boundary.

FIG. 6 illustrates yet another embodiment employing diffraction waves to determine the position of an object boundary point in space. As shown, laser beam 200 illuminates the edge boundary 201 of a machined part 202 producing a diffraction wave 203, in common with all of the previous embodiments however, the total diffraction wave in both directions is collected using lens 204, in whose focal plane is stop 225 to eliminate the undiffracted radiation of the laser beam.

At the image plane 210, of lens 204, an "edge image" minimum, 212, will be produced, as is known in the art. This central dip is easier to focus on by eye than asymmetric edge image formed in the usual manner by optical protectors and the like. This diffractive image as it were of the boundary moves in space with the boundary multiplied by whatever the geometric magnification of the lens system happens to be.

However, the disclosed embodiment of the invention does not necessarily rely on the existence of a dip which is known in the art. It is rather that the total symmetric diffraction wave produced spot (which may not even include the dip if viewed or a defocused position such as 215) moves in space with the boundary and this spot is itself symmetric and can be used very advantageously in conjunction with a continuous position sensor photocell such as 218 (eg. UDT SC 10 or the equivalent). In this manner small changes in the position of the spot signifying the object boundary can be determined from the output of the photodetector. Alternatively, a scanning photodiode array such as 220 (dotted lines) can be used to determine the location of the peak of the defocused diffraction image which generally makes a more accurate system than present system trying to determine the asymmetric shadow of the edge.

We note the use of lens 204 allows the stop to be in the proper position even though the center axis of the system moves. Incidentally, this stop, when unidirectional displacements are monitored, or positions are monitored is usually in the form of a inverted V as shown by 225, since it is desirable to block the off-axis reflections of the object. It should also be noted that object dimensional characteristics can be determined as in the repetitive checking of parts by using a fixture to hold a master part from which and succeeding test parts are then compared. The photosensor can be centered on the image of the master part and signals produced depending upon the position of the test part image. Where cylindrical objects rather than wedge shaped objects are utilized, the system employs further mask 230 (dotted lines) to restrict the waves from the object to substantiate the diffraction waves since in the area of positive angle $\theta$ a considerable reflection wave can be produced by a cylindrical object, as discussed.

Figure 7:
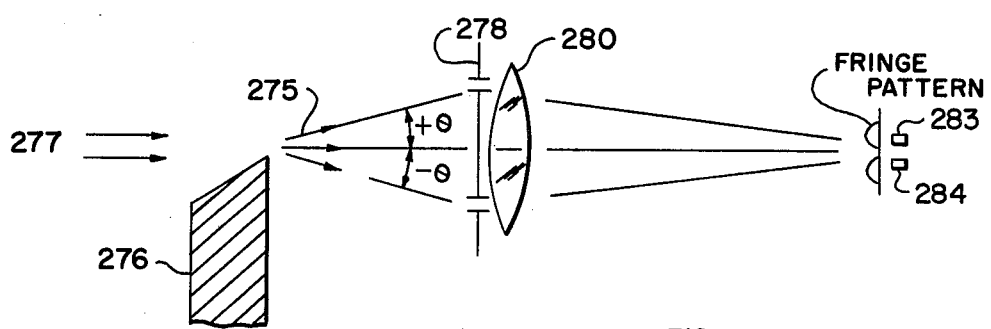
FIG. 7 illustrates an embodiment of the invention using two intersecting beams and two subsequently diffracted rays from a boundary position.

FIG. 7 illustrates an embodiment whch is at once similar and yet totally different from the foregoing embodiment. In this case, diffraction waves 275 from object 276 illuminated by laser beam 277 are also collected (after passing thru a mask 278), as above. In this case however, only very small angular zones $\Delta\theta$ are subtended by the apertures in the mask, each centered on equal and opposite values of theta. In this way the waves focused by lens 280 (or otherwise combined using a mirror system) are essentially equally changing in phase magnitude with movement, but are 180° out of phase. The fringe pattern thus formed at the lens focus (ie. where the 2 beams intersect) is twice as sensitive to object movement as the embodiment of FIG. 1. The magnitude of phase change for a given movement $\Delta X$ is $\Delta X \sin\theta/\lambda$ times 2.

Contrary to the case in FIG. 1, the fringes produced by this embodiment do not change in spacing as the function of the movement of the object, and this is an important feature since it allows large ranges and easy phase quadrature detection using a pair of detectors such as 283 and 284 which allow direction of motion of the object to be determined, as well as fringe count multiplication.

The system as shown in FIG. 7 is primarily sensitive to movement in the direction shown which is referred to as the "X" direction. Movements in the Z direction cause equal phase changes at each angle and do not therefore change the position of the fringes. It does however change the sensitivity since the effective angle theta changes.

It is possible to set up the system of FIG. 7 using a multiple lens system so as to keep the center line of the radiation always centered on the mask as shown in FIG. 6. This, however, is not usually done because movements are usually monitored only over small changes in dimension $\Delta X$. This system is not particularly useful for checking the absolute size of industrial parts since the fringe pattern generally yields meaningful information only in response to changes in position of the same object boundary.

Figure 8:
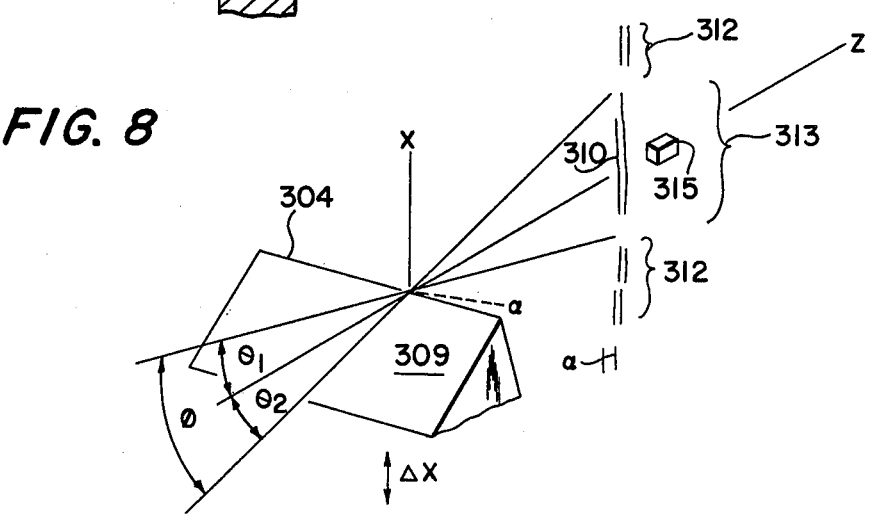
FIG. 8 illustrates an embodiment of the invention utilizing two opposite portions of the diffracted wave from an object to form an interference pattern from which changes in object position can be determined.
Figure 8:
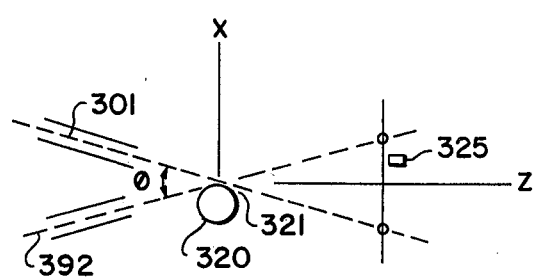

Another embodiment utilizing two diffractive waves from the object boundary which are mixed together to form interference fringes proportional to the displacement of the boundary is shown in FIG. 8. In this case two incident beams are used each separated by included angle $\theta$. This angle is effectively equivalent to the angle $2\theta$ shown in previous figure, and results in two diffraction waves which are out of phase by the same amount. In this case however, it is the total diffraction waves which are out of phase, not just portions thereof.

In operation, two phase related monochromatic light beams, 301 and 302 (are usually derived from the same laser by means of a beam splitter and mirror), are directed so as to overlap in space the object boundary, for example boundary 304 of object 308.

As the linear extension of boundary 304 is brought approximtely into line perpendicular to the plane of beams 301 and 302, a set of fringes, 310, are observed to form in the overlap region 312 and 313 between diffraction waves, produced by object boundary effects on the incident beams. These fringes are spaced approximately in the direction of the linear boundary (y direction perpendicular to the plane of the incident beams 301 and 302) as shown.

With the displacement of the boundary 304 in the direction perpendicuar to the centerline 315 between beams 301 and 302, the fringes are observed to move in space in the y direction with their direction of movement (either plus or minus y) being a function of the direction of movement (plus or minus x) of boundary 304.

It should be noted that the fringes produced by the apparatus of FIG. 8 are twice as sensitive to displacement of a boundary as would be the case in my previous Diffractographic work.

Thus four times the diffraction wave intensity is available for a given sensitivity. However, far more power than this is available, since the total waves vary in phase, allowing large detectors to generally be used.

Another very interesting feature of the FIG. 8 apparatus is that both diffraction waves are completely out of phase wth each other at all positions, not just at certain angular ones as has been previously the case. This means that when the diffraction waves are lined up so that they overlap each other, there will be total dark regions within the region between them and at the same time light regions in the outer areas.

As boundary 304 is brought into alignment perpendicular to the plane of beams 301 and 302, the fringes 310 begin to form said fringes making a slight angle as indicative of the slight angle $\gamma$ (from the perpendiculr case) remaining.

At the condition of total alignment there is a complete cancellation of the diffraction waves at those points in which the amplitudes are equal. Thus a "dark fringe" is formed in the region 313 between the beams and at the same time "light fringes" appear in region 312. With a movement of boundary 304, the region 313 is observed to go alternatively light and dark whereas in opposite phase the region 312 goes dark to light.

Since the fringe size of fringes 310 is constant, a bi-directional counting ability is easily obtained by using a detector with two elements which are 90° out of phase with respect to the fringes, such as 315.

It is also possible to have a bi-directional counting ability in an aligned ($\gamma = 0$) system, with one detector covering the whole region 313 and, as it is 90° out of phase opposite, two hooked in parallel in region 312.

Since the fringe size never changes in the apparatus in FIG. 8, displacement range is essentially limited only by the width of the overlap region of the beams 301 and 302 in the x direction.

To confirm the above operational features, I ran a test in which the laser and beam dividers were located at thirty inches away from edge 304. The angle $\phi = 2\theta$ was set such that its sine for the movement of boundary 8 in the x direction provided one fringe every 0.0005". The formula was verified, as this is exactly what occured in practice.

When small angles $\phi$ are used, there is quite a large "stand-off" distance between the laser and optical components group (beam splitters, mirrors, etc.) and the boundary. This is both good, in that it allows one to get a long way away from the measured object, and bad, in that being a long way away means that the potential for mechanical vibrations, which can cause an apparent movement of the beams 1 and 2 relative to the boundary, can occur.

It is further noted that the detectors and general pattern formed could be formed on the same side if a rectro-reflective element such as a mirror or prism is located at the position preferably near the boundary 304.

Note that it is not necessary to have $\theta_1 = \theta_2 = \phi/2$ to maintain the proper phase relationship. However, only in this condition are the diffraction wave intensities matched. Also, problems arise with cylindrical boundaries.

Note, too, that this embodiment of the invention can function even when the two incident beams 301 and 302 do not cross at the boundary. Indeed, one can hit with each beam a totally different portion of the boundary, with geometric or other means used to aid in combining the diffraction waves. (The concepts here blend into those described relative to FIG. 11, and are discussed below.)

It should be added that, for cylinder objects, the same portion of the boundary is never used to produce the diffraction wave from each incident beam. This is seldom a problem in object movement or roughness measurement, and is seldom a difficulty even in profile measurements at least as long as $\phi$ is relatively small.

For a cylinder object, such as 320, with boundary 321, it is usually best to detect fringes at a position near the center of beam 302 (as shown), either at location of detector 325 or, less preferably, on the opposite side. Only in this region is maximum contrast obtained since the diffraction wave from 302 roughly balances the intensity of the diffraction plus reflection waves caused by beam 301.

Note that systems of this type can be used to measure the movements of small reflective strips placed, coated or embossed on an object or conversely dark zones on a reflective object. Such systems can be used to construct strain, torque and other sensors, as well as for general displacement measurement of surfaces, and points thereon.

Figure 9:
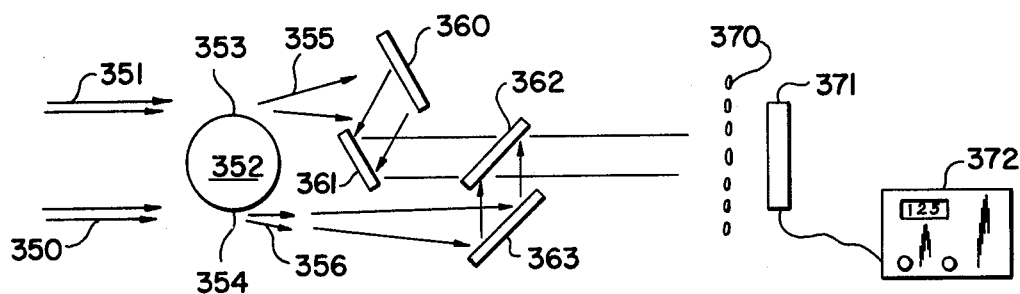
FIG. 9 illustrates an embodiment of the invention utiizing coherent diffraction waves from opposite boundaries of an object.

FIG. 9 illustrates a further embodiment of the invention utilizing an interference pattern produced by diffraction waves from opposite boundries of an object.

As shown, coherently related beams 350 and 351 from a laser, strike object 352 (which, for example could be a bar, moving out of the plane of the figure), producing diffraction waves 355 and 356 at boundaries 353 and 354, respectively.

Using suitable optical elements, such as mirrors 360, 361 and 363 and beam splitter 362, the two diffraction waves are overlapped to produce interference pattern 370. This pattern is proportional to the effective value of w, which is the spacing of the center lines of the two diffraction waves after combination by beam splitter 362.

This spacing is clearly a function of the object diameter, which is variable, and the optical element's position, which is fixed. While a zero spacing is possible, (in which both diffraction waves would be in phase at all points, with no resulting fringes) in general it is non-zero and the fringes vary accordingly. Thus, the sensitivity of a small w situation is obtained even for objects of large diameter. This is a unique feature of considerable value in the checking of parts with high tolerances such as ball and roller bearings.

Many types of optical combination means can be used, including SELFOC or other coherent fiber waveguides. Similarly, virtually all of the detection means disclosed can be used, since the pattern has similar properties to those I have previously discussed. Shown is a scanning photodiode array 371, and digital readout 372, used to obtain the pattern fringe spacing on the position of a a fringe.

In the embodiment of FIG. 9, it is clearly equivalent to utilize the apparatus to determine the spacing or change therein, of any 2 spaced boundaries, the minimum spacing determined by the apparatus. The boundaries could be the inner boundaries of an aperture in an opaque mask, or even located on entirely separate members.

At this point is noted that the disclosure here is not limited to single boundary diffraction wave producing means. For example, in the apparatus of FIG. 1, a reference diffraction wave producing means in the form of an object, such as a wire, with two illuminated boundaries could be used, in accordance with concepts discussed in my referenced co-pending applications.

It is further noted that while the invention herein is primarily directed at measurement and inspection applications, several of the concepts herein are usable for other purposes. Data recording and playback, is perhaps the largest area, since any technique such as the invention, which can measure surfaces without contact to very high resolutions, can also be used to read very small data bits encoded as a surface variation.

The next two embodiments discuss means for measuring surface roughness of cylindrical and other parts capable of producing a boundary diffraction wave. This is a large class including piston pins, cam shafts, crank shafts, valves, valve lifters etc.

First, consider FIG. 1. As can be seen where cylindrical object 10 to be measured is translated out of the plane of the diagram, the separation between the reference edge 15 and the object 10 is changed in accordance with the roughness of the surface, in addition to any errors in the form of the surface and in the translation mechanism. Generally speaking, one is not interested in this roughness and therefore a large enough area is illuminated, for example 0.030″, the effective size of an average laser beam, such that an average is essentially taken over whatever minute roughness exists. Through such averaging, a gross profile of the object can be obtained, as can changes in dimension from one object to the next, as utilized for sizing purposes as was discussed relative to FIG. 1.

Clearly however, an optional cylinder (or spherical) lens such as 40 can be employed such that a very small focal line (zone) is produced at or near the object boundary. In this case the object diffraction wave contribution to the diffraction pattern comes from a very small portion of the boundary and consequently the effects of object surface roughness would be seen by the detector 30. This focal line is, in a sense, a probe similar in size (and indeed smaller than) those stylus probes utilized in standard mechanical profilometers. Thus, were the high frequency output of the photodetector 30 to be analyzed it would indeed give a figure proportional to the peak to peak, roughness, (or RMS, AA etc., depending on what circuitry was employed). Therefore, the first means for measuring surface roughness according to the invention is simply to locate an object on a fixture such as 11 in FIG. 1 which itself is mounted on precision translation mechanism, 41, such as an air slide, used to provide an extrinsic reference. Translation of the object out of the plane of the diagram is essentially error-less, and therefore all high frequency information is due to surface roughness, as desired. Reference edge, 15, would be attached to the base plate to which the air slide, with fixture, is mounted.

The surface roughness measurement system just described is of course able to profile objects as well, over the length of travel of the translation mechanism. Clearly it is also possible to translate the source, reference boundary and detector leaving the object fixed, and indeed such translation may be done optically, rather than mechanically by scanning the laser beam down the object. (See FIG. 13 for a suitable scan type system, as well as my referenced patent and applications). In this case, a suitably long reference boundary is required, extending over the object length desired. Note that when such a long reference is fixed with respect to the object, it is not necessary to have a precisely planar scan of the laser beam.

Where only surface roughness information is required, it is possible to dispense with the precision translation mechanisms using three techniques now described. The first is to utilize a translation mechanism of any type such as 400 shown in FIG. 10 while utilizing a plurality of detected y axis position in the fanned diffraction pattern 401 produced by laser beam 402 focused by optional lens 403. In other words, a microprofile is made of the object surface 405 in the illumination zone 406 according to means described herein and in my U.S. Pat. No. 3,797,939, Diffractographic Measurement of Profile, to give roughness information. If such a profile is done at sufficiently high speed (eg. 500HZ), all object motion is effectively frozen and diffraction pattern changes correspond only to roughness — even though no physical contact between object and reference exists.

A good means for obtaining such a micro profile, is to use a scanning photodiode array such as 410, located at angle $\theta$ and extending in the y direction. Obviously, matrix arrays and other scanning means can be used as well to obtain fringe intensity, position, or spacing information in accordance with the invention. Note that lens 403 is not required and the zone illuminated can indeed be as large or larger than the roughness width cut-off, if desired (thereby producing a roughness value over normal cut-off lengths even if the object is stationary). For example a 0.030″ effective laser beam width diffraction wave from the object can be scanned, for example by a rotating wedge, in the y direction past a stationary detector. If the detector aperture (y direction) is 0.0001″, this is then the effective probe width. Where a longer cut-off is desired, more of a surface can be illuminated and converged to a central detector/scanner location. If desired, the detector can be moved with respect to a stationary pattern to perform the scan, or a scanning photodiode array can be used, as above.

Note that in the case where the diffraction wave from a zone equal to the desired roughness width is scanned, the AC component of the diffraction pattern variation during the scan is the desired roughness signal.

Figure 10:
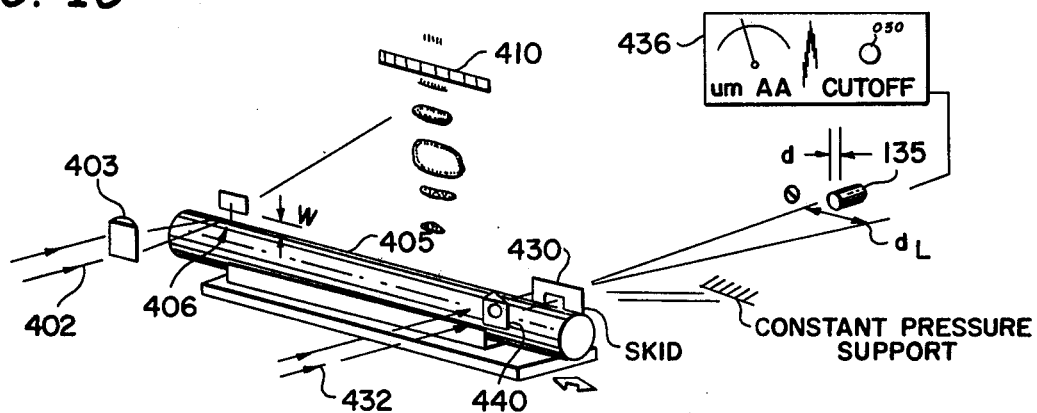
FIG. 10 illustrates an embodiment of the invention utilized for determining surface roughness of an object.

Another embodiment of the invention for obtaining surface roughness information is also shown in FIG. 10, right hand side. In this example, the reference edge boundary 430 is supported by a skid riding on the part surface in question, 405, thereby providing an intrinsic reference. Such a skid arrangement is similar to that used in commercial stylus type instruments except that in this case the actual part measurement is performed in a non contact manner using laser beam 432, and detection/analysis means previously described, for example single off-axis detector, 435 and readout/averaging circuitry 436.

Generally, the part is moved past the sensor position but the opposite may also be accomplished. As in previous embodiments a cylinder lens such as 440 may be used to focus the radiation onto a line, which is further divided by the ratio of detector width "d" to cylinder lens produced diffraction wave "fan" width $d_L$ shown. The effective "probe" width represented by the detector field of view in the y direction can therefore be small indeed (for example, under one micron).

In all these surface roughness embodiments, fiber optics and/or miniature lasers can be used to advantage to construct practical modular sensors which may be easily manipulated and employed.

Figure 11:
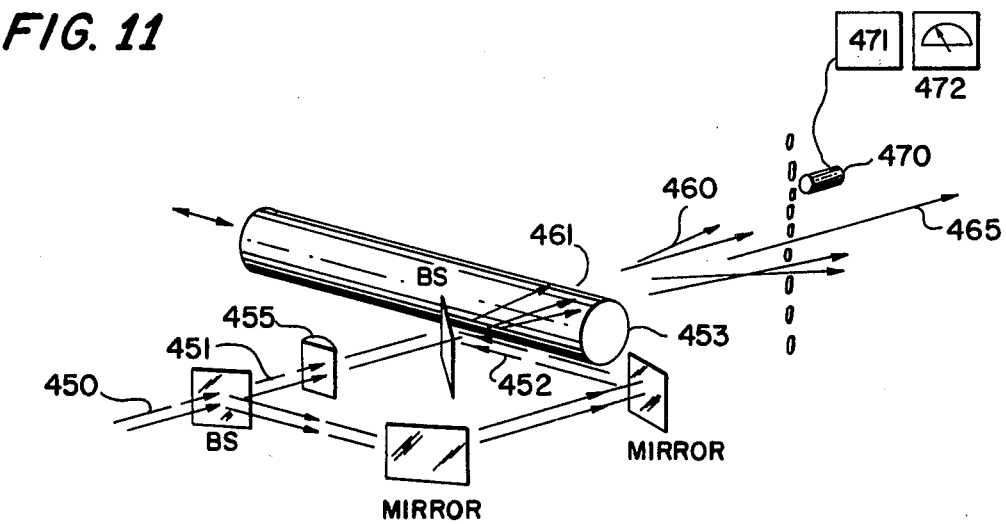
FIG. 11 illustrates an alternative embodiment of the invention utilized for surface roughness determination.

FIG. 11 illustrates a rather interesting type of intrinsic datum surface roughness diffraction on wave sensor. This is related to that described in the last Figure of my U.S. Pat. No. 3,883,249 which I have termed a local reference wave diffraction concept. In a sense it involves utilization of a second diffraction wave from the object to provide a local reference wave which acts as an optical "skid".

As shown in FIG. 11, laser beam 450 is split using known means into two coherent portions 451 and 452 each of which impinge on the object 453 to produce diffraction waves. As shown, however, the "probe" beam 451 is focused by cylinder (spherical) lens 455 to a fine line (spot) on 456 on the object, as in the previous figure. The diffraction wave 460 produced by this "probe" beam interferes with diffraction wave 461 resulting from beam 452 which contacts the object over a much larger area (which may or may not include the same area contacted by the probe point). In the case shown, where both the probe and the reference waves are produced on the same center line 465, the fringes lying on this centerline due to interference of the waves are due totally to phase differences between minute portions of the probe wave 460 and the average wave 461 over the area surrounding the probe. Monitoring of variations in this pattern due to roughness at the probe zone relative to the average in the area around the probe can be done by any other means shown in the application and references and in this case is done with a single detector 470 connected through amplifier 471 to a readout 472. Note that it is usually desirable to use a slight geometric recombination angle between the two diffraction waves in order to cause fringes to form at an angle such as shown in the figure.

Now discussed is an embodiment of the invention of considerable use in the determination of color T.V. aperture mask dimensions and the like. This embodiment is of particular use in determining the slot and the bar widths of the new slot type masks now reaching production (which are difficult to measure by other means).

Figure 12:
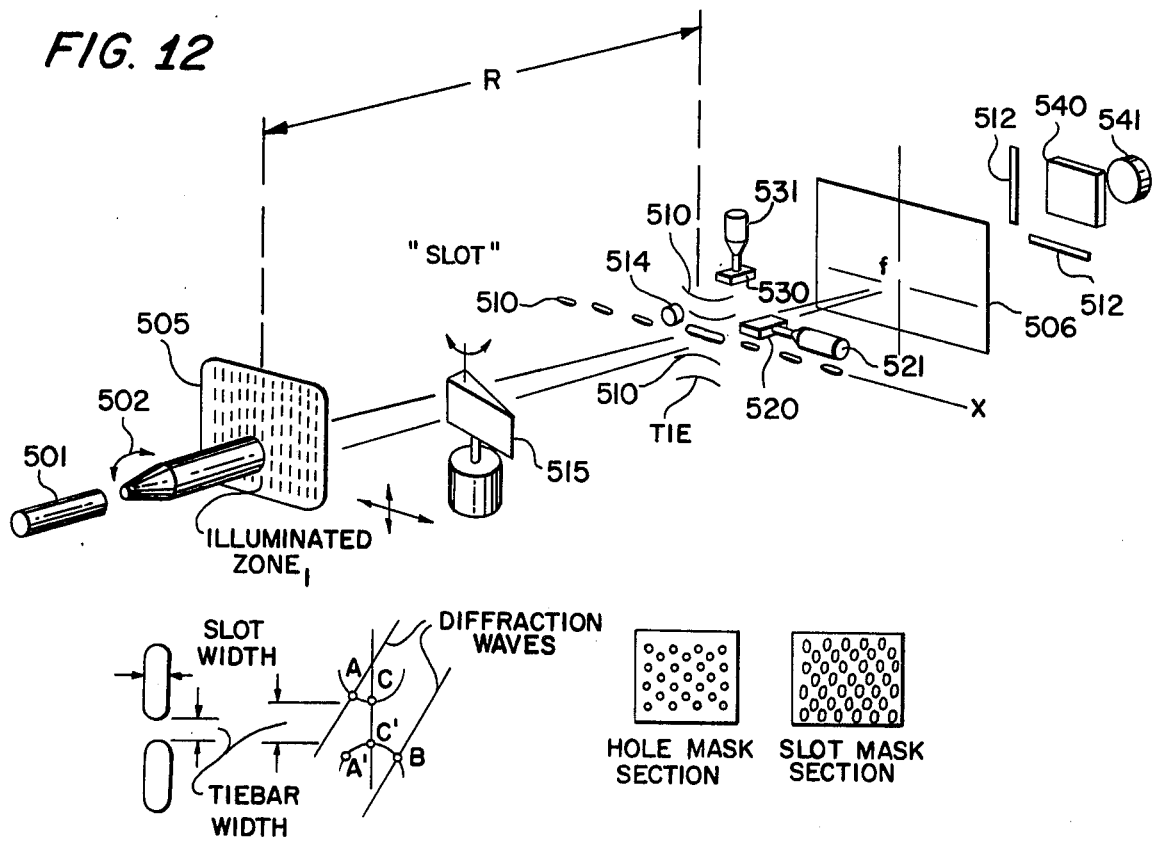
FIG. 12 illustrates an embodiment of the invention for determining the dimensions of color T.V. aperture masks and other arrays of elements.

Consider FIG. 12, which illustrates apparatus capable of obtaining the average dimension of apertures in two orthogonal axes in either hole or slot type masks. As shown, gas laser 501 emits a beam which is expanded and focused to point f by spherical lens system 502. When mask 505 is inserted as shown, a characteristic interference pattern is produced at the focal plane, 506 resulting from interaction of the diffraction waves from all "N" apertures illuminated by the expanded beam from lens system 502.

The characteristic pattern produced contains fringes which are proportional in their spacing and position to the dimensions and spacing (almost always periodic) of the mask apertures. Suitable analysis of such patterns can therefore be used to give, in real time if desired, such dimensional information.

However because of the interference effects produced by interaction of waves from each aperture, I have found that patterns produced at the focal plane are not generally useful for determining the dimensional information needed by the mask making industry, namely the average diameter of the apertures themselves, and, in slot mask production, the average width of the slots and tie bars. To alleviate this problem, I have devised some simple solutions which may be used, in combination if desired. The first is to move the plane of observation away from the focal plane either closer to or farther from the mask. At a suitable position, say 1/6 to ⅓ of the focal length away from the focal plane (for a ¼" effective illumination beam diameter), the undesirable intermodulation of the individual aperture patterns converging toward the focal point effectively disappears, and the resulting pattern, 510, becomes, in effect, the sum of the individual aperture patterns. This allows many of the simple detection means I have described in my previous applications to be used.

The second technique to decrease inter-aperture modulation effects is to insert a ground glass or other diffuser, spaced a distance d, just ahead of the observation plane. While this works to some degree with a focused pattern, it is best utilized in combination with a defocused pattern such as 510. For example, focal length 9.8", R = 73", d = 1/16" makes a good combination, as do many others.

As mentioned previously, A system based on the concepts described is particularly advantageous for use with slot masks. In this case a two axis pattern is produced proportional to the slot width and the bar width only (when in the defocused condition), which are the two variables desired to measure — a very advantageous result. Typical slot and hole mask sections are shown in FIG. 12, together with a close up of the tie bar zone. Note that in the defocused case, tie bar width, not slot length predominates (as tie bar width is at least 3 times smaller).

Note that an expanded Gaussian ($TEM_{oo}$) laser beam is peculiarly good from the point of view of continuously traversing across the mask (a desirable feature of the invention allowing rapid on or off-line measurement). The Gaussian dies off toward the edges and thus new aperture boundaries entering and leaving the illumination field produce no sudden increases or decreases in power diffracted. A surprisingly smooth transition has been noticed indeed.

It is interesting to contemplate why the tie bar pattern looks the way it does, producing fringes which are more widely spaced in the region where the tie bar is also widest (the inverse of normal experience). I have explained it this way. Since interference can only occur between diffraction waves which overlap, it is clear on consideration of the tie bar close up shown, that it is the waves from points A and B which must interfere, not those from A and A', say. The effective width of the tie bar in the direction of waves from A and B (normal to the respective edges at these points) is however, smaller than the measured tie bar width across CC'. Hence the explanation. Clearly this applies to other diffraction wave interference situations as well.

When a cylindrical, rather than spherical beam expander is used, only a narrow strip of mask is illuminated at any one time, rather than an area. If this strip is aligned parallel to the slot length, then interference between individual slot width patterns does not effectively take place (though it does with the bars) since the unexpanded laser beam is about equal to the center slot spacing. (ie. ≃ 0.030").

Unlike classical geometrical optical systems, the disclosed embodiment is virtually free of errors due to translation of the mask in the direction perpendicular to its plane. For example, a ¼" translation as might be found on a production line, causes an error of but 1% if R is 25". And too, small tilts of the mask plane cause only a cosine error, usually negligible.

Illustrated in FIG. 12, are several detection techniques for both absolute determination of pattern variables (and therefore mask dimensions as well as changes in same from some initial (master) value). For the slot mask 505 shown, measurement is made in two orthogonal directions to obtain tie bar and slot width. Such measurement on a hole mask gives diameter on two axes and a measure of ellipticity).

The first and simplest detection scheme is to use a single off axis photodetector such as 520 attached to micrometer 521. Using an amplifier and readout 522, this detector can indicate the presence of a pattern fringe minimum or maximum, and using the micrometer to scan the detector, through the pattern, the position of a particular fringe, or the spacing between any two fringes, can be determined. Using the equation below $$w_N = R\lambda/s$$

for example, the average slot width $w_N$ can be determined, where $\lambda$ is the wavelength used and s is the spacing between any two adjacent fringe minima or maxima on one side of the axis. Generally, the most accurate reading is given by using, $$W_n = nR\lambda/x_n$$

where $X_n$ is the distance from the pattern centerline to axis: n or $$W_N = 2nR\lambda/2X_n$$

Where $2 X_n$ is the distance between like fringe orders n on opposite of the pattern axis. In a similar manner, average tie bar width can be determined using detector 530 attached to micrometer 531. Clearly other means of measuring pattern spacing or position can be used as well, and the referenced applications certain a large variety of same. Three are now discussed.

The first technique is to utilize a scanning photodiode array, 512 (such as a Reticon 256C) on each axis. The output pulse train is then converted to an analog signal which is differentiated to find the null positions.

Because of the idiosyncrasies in the defocused pattern however, the otherwise very desirable scanning diode array must be employed with some additional data analysis capability, since each detector sees only a small pattern portion and is therefore subject to error if spurious intermodulation effects occur.

If the high speed capability of such a solid state array is not required therefore, it is generally preferable to utilize a split photodetector/differential amplifier such as 514 (eg. UDT DIN-2D) to determine the presence of a fringe maxima or minima. Two practical systems are described. The first utilizes an oscillating wedge (rotating mirror, etc.) 515 as shown to scan the pattern past the detector. Only a small scan angle need be required. Since w range on any one mask is under 0.002", and in all cases slot dimension is between 0.0035 and 0.010" (W range of 0.0065"). Accordingly the scanner can be of high frequency and reasonably linear, with scanner angular position at the time a null is detected (or between two nulls) giving w average. Scan position can be determined from the scan drive voltage signal or independently. Note that such a system can be used in a serve loop fringe tracking mode. This is often most convenient when sweeping across a mask, for example.

For a two axis (slots and tie bars) system such as shown in FIG. 12, it is desirable to use a beam splitter to create two independent patterns, one of which is scanned in the slot fringe direction, the other in the tie bar direction, past their respective detectors.

A final technique, is to automate the movement of detectors 520 and/or 530. For example, micrometers 521 and 531 respectively can have motor drives controlled in a servo system by the split detector outputs in order to track a particular fringe. Shaft encoder, or synchro outputs on the micrometer screws give position and therefore $x_n$. Alternatively, two pattern fringe positions can be obtained and s determined.

In the same vein, the detectors may be scanned over short distances in the pattern using galvo or piezo drivers, etc. Even a solenoid/LVDT combination can be used.

In practice, it is generally not necessary to determine pattern spacing or position each time a measurement is desired. Generally the range of slot or tie bar widths required for any one mask (the typical mask has less aperture width at the edges than in the center) is less than ¼ the nominal width. This being the case, a properly positioned single detector, such as 530, can be used in just the same way as 30, in FIG. 1, to produce a calibrated output proportional to the half fringe cycle moving past its face over the range. In this instance, the detector is almost always located so as to see the ramp of the fringe n = 1 to n = 1.5.

Operationally, high/low master mask segments can be used to periodically calibrate the system. These segments may themselves be measured using the micrometer scan mode shown (determining fringe spacing or position).

It is of interest to consider exactly what the detector 520, for example, sees in the apparatus of FIG. 12. If it were in the focal plane of lens 502 it would see the true superposition of all slot patterns - confused however so as to yield generally inaccurate results (except with scanning type systems and sophisticated data analysis) by inter-pattern interference effects at the higher spatial frequencies corresponding to slot to slot spacing. When the detector is positioned at the defocused position, as shown, the inter-pattern modulation effects disappear, as is desirable. However, the patterns cannot be said to be truly overlapped, since they are converging toward a point not yet reached. This does not seem to be a problem however. Since the patterns are symmetric about the lens centerline, the smearing takes place equally on both sides of the true minimum position, for example, with the result that the detector reads said true position (even though at non-zero intensity).

Note that the best defocused positions seem to be where the pattern is just starting to show indications of inter-aperture interference fringe formation. At or near this point, a desirable "woven rug like" appearance is often observed.

Note too, that movement of the mask in the laser beam tends to have a desirable effect by dithering the intermodulation effects on the detector face. By integrating in time over a few dither cycles, a smoothed out output curve from the detector is produced. If not present naturally, such relative mask/system movement can be introduced on purpose.

Because of such smearing effects when operating in the defocused condition, it is generally preferable to keep the effective (3db) Gaussian beams less than 1" diameter. For example, for a Gaussian beam of ½" dia. (3db) the maximum slot smearing at R = 43 inches with a focal length of 51 inches, is about ax = 0.040". However, at R = 43 inches a 0.006 inch nominal slot has its first fringe located at $x_1 = 0.2''$. Thus the error band is 0.040" centered on 0.2" which is quite tolerable, while still encompassing a large number of slots (eg. >150). Though a smaller beam could be used, which would decrease the error band even further, it is generally not desirable to go below 30 illuminated apertures, due to spurious effects as the mask moves through the illumination field and increased intermodulation effects (unless undesirably short R distances and focal lengths are used.).

A final type of detector system is the spatial filter type shown in FIG. 12. The slot and tie bar patterns pass thru a filter 540 on which a negative of a nominal (e.g 006" slot) pattern is recorded. Changes + or − from this value are noted as increased light levels by detector 541 placed behind the filter, and over a range such changes are quasi-linear. Direction cannot be determined directly, but could be independently obtained from consideration of total pattern intensity, which increases as slot width increases (and tie bar width decreases).

Figure 13:
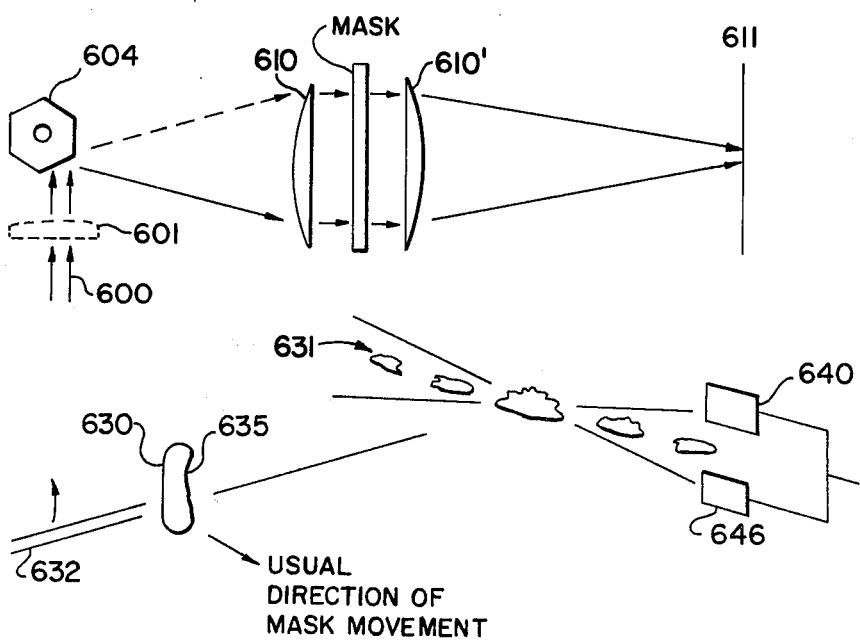
FIG. 13 illustrates an embodiment of the invention used for determining dimensional flaws in color T.V. aperture masks.

FIG. 13 illustrates a further embodiment for checking T.V. aperture mask dimension, and particularly errors in form of the individual apertures. This system is particularly suited, as is that of FIG. 12, to on-line inspection of such masks.

As shown, laser beam 600, optionally converged by long focal length convex lens 601 is scanned across a slot type mask 602 by scanner 604, in a direction perpendicular to the direction of travel of the mask. The diffraction waves from each slot, or portion thereof, illuminated are collected in succession by cylinder lens 610 and focused to plane 611. Note that a pair of cylinder lenses, such as 610 and 610' one on each side of the mask, can be used where it is desirable to collimate the light passing thru the mask. In this case longer focal length cylinder lenses can also be used.

If a single slot (or tie bar) is illuminated at any one time, the pattern in plane 611 will be similar to that shown in FIG. 12 in the slot (tie bar) direction, but not in the tie bar (slot) direction. Therefore, from a measurement point of view this system would work best for slot width or tie bar width, but not both at once unless a reasonably large area was illuminated. (Each could be done in succession, however). For errors of form, however, the systems can easily spot slots whose edges are not parallel as desired. Consider slot 630 and its pattern 631 when waves from converging pencil of light 632 are upon it. When non-parallelism of a particular slot wall such as 635 occurs, the diffraction waves propagate out of the plane of the normal slot diffraction waves and can be picked up by a detector such as 640. Conversely, the non-uniformity of the fringe pattern across its width can also be detected. Either detected signal can be used to indicate the presence of a faulty slot.

At the end of the slot lies the tie bar whose concave edge emits a fan of diffracted radiation. When this fan is produced, a good quality tie bar is signified by a uniform fan. Accordingly, detectors circumferentially disposed in the fan can determine if a good tie bar edge exists.

Clearly, the concepts of FIGS. 12 and 13 are not limited to T.V. aperture masks, but are usable in any array of like apertures or bars (wires, etc.) which may be periodic or randomly spaced. However, such masks are considered to be the largest application and the disclosed invention is considered to represent a considerable advance which may virtually eliminate the extensive human inspection presently required while providing greatly increased accuracy.

It is understood that the invention disclosed herein is not limited to the exact embodiments illustrated, and that the concepts disclosed are applicable to a wide range of measurement and inspection tasks.

What is claimed is:

1. A method of determining the position of an object comprising the steps of directing an electromagnetic wave front of known spatial intensity distribution from a wave source onto a boundary of an object to produce a diffraction boundary wave, determining from said diffraction wave the portion of said wave of known spatial intensity distribution intercepted by said object boundary and determining therefrom the position of said object.

2. A method according to claim 1 comprising the further step of directing an electromagnetic wave front of known spatial intensity distribution from a wave source onto a further boundary of said object to produce a further diffraction boundary wave, determining from said diffraction wave the portion of said wave of known spatial intensity distribution intercepted by said further object boundary, and determining therefrom the position of said further object boundary.

3. A method according to claim 2 wherein said wave source comprises a $TEM_{oo}$ or $TEM_{ol}$ laser.

4. A method according to claim 2 wherein said electromagnetic wave front comprises a round laser beam having a Gaussian beam intensity profile.

5. A method according to claim 2 wherein determination of the portion of said wave of known spatial intensity distribution intercepted by said object boundary comprises detecting the intensity of said boundary wave relative to the energy in the portion of the electromagnetic wave front which impinges upon said boundary.

6. A method according to claim 5 wherein a detector is positioned for detecting the intensity of said boundary diffraction wave and wherein said boundary is positioned relative to said detector and said electromagnetic wave such that the intensity of said boundary diffraction wave detected by said detector varies substantially linearly as a function of distance from the center of the electromagnetic wave.

7. Apparatus for determining the position of an object comprising wave source means for directing an electromagnetic wave front of known spatial intensity distribution onto a boundary of an object to produce a diffraction boundary wave, means for determining from said diffraction boundary wave the portion of said wave of known spatial intensity distribution intercepted by said object boundary, and means for determining therefrom the position of said object.

8. Apparatus according to claim 7 wherein said wave source means comprises means for directing an electromagnetic wave front of known spatial intensity distribution onto a further boundary of said object to produce a further diffraction boundary wave, means for determining from said further diffraction boundary wave the portion of said wave of known spatial intensity distribution intercepted by said further object boundary, and means for determining therefrom the position of said further object boundary.

9. Apparatus according to claim 7 wherein said wave source means comprises a $TEM_{oo}$ or $TEM_{ol}$ laser.

10. Apparatus according to claim 7 wherein said electromagnetic wave front comprises a round laser beam having a Gaussian beam intensity profile.

11. Apparatus according to claim 7 wherein said object boundary position determining means comprises means for detecting the intensity of said boundary diffraction wave relative to the energy in the portion of the electromagnetic wave front which impinges upon said boundary.

12. Apparatus according to claim 7 wherein said intensity detecting means comprises a detector positioned for detecting the intensity of said boundary diffraction wave and wherein said boundary is positioned relative to said detector and said electromagnetic wave such that the intensity of said boundary diffraction wave detected by said detector varies substantially linearly as a function of distance from the center of the electromagnetic wave.

* * * * *